United States Patent [19]
Eddy

[11] Patent Number: 5,788,184
[45] Date of Patent: Aug. 4, 1998

[54] AIRCRAFT PASSENGER SAFETY ENHANCED FUSELAGE INSULATION BLANKET

[76] Inventor: Robert G. Eddy, 28 Elizabeth La., Mahwah, N.J. 07430

[21] Appl. No.: 778,744

[22] Filed: Jan. 4, 1997

[51] Int. Cl.$^6$ .............................. B64C 1/40; B64D 37/32
[52] U.S. Cl. ...................... 244/121; 244/119; 244/129.2; 244/135 R
[58] Field of Search ................... 244/119, 121, 244/129.2, 135 R; 428/69

[56] References Cited

U.S. PATENT DOCUMENTS

| | | |
|---|---|---|
| 2,819,032 | 1/1958 | Detrie . |
| 2,889,955 | 6/1959 | Naulty et al. ............ 244/135 R X |
| 2,952,428 | 9/1960 | Bridgeman ............... 244/135 R |
| 3,562,043 | 2/1971 | Eddy . |
| 3,740,905 | 6/1973 | Adams ..................... 244/119 X |
| 4,003,377 | 1/1977 | Eddy . |
| 4,235,398 | 11/1980 | Johnson . |
| 4,378,920 | 4/1983 | Runnels et al. ........... 244/135 R |
| 4,899,962 | 2/1990 | Mueller ................... 244/129.2 |
| 5,246,759 | 9/1993 | Keller ...................... 428/69 X |
| 5,398,889 | 3/1995 | White et al. .............. 244/119 |
| 5,431,990 | 7/1995 | Haynes et al. ........... 244/119 X |
| 5,472,760 | 12/1995 | Norvell ..................... 244/119 X |
| 5,577,688 | 11/1996 | Sloan ....................... 244/119 X |

FOREIGN PATENT DOCUMENTS

| | | |
|---|---|---|
| 521227 | 5/1972 | Switzerland . |
| 1235919 | 6/1971 | United Kingdom . |

OTHER PUBLICATIONS

J. Migliaccio, McDonnell Douglas Co., "Insulation Design & Philosophy of Narrow Bodied Aircraft", Aug. 5, 1993.
M. Icke, Dowty Energy Control, "The Function & Structure of Air & High Speed Surface Transport Equipment Sidewall Insulation Systems", Aug. 5, 1993.
R. Elliott, The Boeing Company, "Wet Insulation—Boeing Efforts to Determine Cause & Cure", Aug. 5, 1993.

H. Lütjens, Deutsche Aerospace Airbus, "Moisture Ingress in Aircraft Insulative Materials and possible Solutions to the Problem", Aug. 5, 1993, see p. 3/24. Introduction: Wet insulation blankets continue to be a problem for operators and manufacturers alike.

Andrew C. Revin, The New York Times, "Officials Say a Disputed Rule Might Have Saved Flight 800", Oct. 24, 1996.

*Primary Examiner*—William Grant

[57] ABSTRACT

An aircraft fuselage insulation blanket of the flexible type including an insulator core (24), including a predetermined volume contained by a vented flexible blanket casing (26) having a vented plurality of seam joined tailored panels (30), in which the seams are hermetically sealed. The panels include a flexible encasement material (29), having at least direct sealing properties to form hermetic seals (33), including at least a flexible plastic barrier film (52). The casing (26) has at least one vent (34), attached to at least one hermetic joined gas flow adapter (36), to displace air and to be connected by gas flow connector (38) to a substantially inert gas pressure source (39), to inflate blanket (14). Pressure source (39) includes a modular control (37), by which the blanket can be regulated to a predetermined substantially positive pressure relative to the cabin compartment (10) atmosphere's pressure, to displace and to occlude moist air from the blanket. The modular control (37) includes a discharge outlet (40), connected by fuel tank gas connector (42) to supply substantially inert gas to at least one fuel tank's head space (23). The fuel tank (21) includes a modular control (44), which communicates intelligently with modular control (37), in a cooperative way, to provide substantially inert gas either from blanket (14) or from source (39). Such substantially inert gas occludes and displaces excess air, to maintain the fuel vapor to air ratio below its lower explosive limit. This inhibits an explosive fuel vapor to air mixture in the fuel tank's and eliminates the possibility of accidental, transient energy, or terrorist ignition of such fuel vapors and explosion of the aircraft.

12 Claims, 6 Drawing Sheets

AIRCRAFT PASSENGER SAFETY ENHANCED FUSELAGE INSULATION BLANKET

BACKGROUND—FIELD OF INVENTION

This invention relates to aircraft fuselage insulation blankets, specifically to such aircraft insulation blankets which have a flexible casing.

BACKGROUND—DISCUSSION OF PRIOR ART

The cabin compartment is the innermost area within the surrounding aluminum shell of the conventional aircraft fuselage. In flight, the aluminum shell is subject to extreme changes of temperature. To maintain a comfortable environment in the inhabited cabin compartment, a fuel efficient aircraft requires that the cabin compartment be substantially surrounded by effective thermal and acoustic insulating systems. Prior art insulation systems have been known to accumulate and retain thousands of pounds of condensed moisture in flight. Such moisture saturated insulation blankets are ineffective insulators and detract from the fuel and payload efficiency of the aircraft. Furthermore, flame retardant chemical additives, as used in certain prior art insulation blankets, decompose when they are heated and release highly toxic fumes. Inhalation of such fumes can debilitate occupants of the cabin, even before flames can be seen. Such fumes can inhibit safe evacuation of the passengers of a burning aircraft.

The conventional flexible insulation blankets of typical aircraft are designed to fit the contours and spacing of the structural components of each fuselage section. Such prior art blankets are fabricated from a thermal and acoustic insulating material, or so-called insulator core material. The insulator core material is, typically, a glass fiber batting. It is contained in and surrounded by a flexible blanket casing. The basic prior art insulation blanket's encasement material is usually a relatively thin moisture barrier film, for example, a 6.3 micron thick polyester film with a textile reinforcement joined to the face of the film. The textile reinforcement is attached to the film on the side nearest to the core, typically, with a hardenable polyester type resinous adhesive material. Such flexible encasement materials are cut or tailored to a predetermined pattern of panels. The panels are seam joined to form a surrounding flexible container or blanket casing to unitize and support the lofty, fragile insulator core material. This allows attachment of the blanket unit to the aircraft fuselage structure.

The insulator core's design thickness, density and composition may be varied between sections of the aircraft. Likewise, the weight, thickness and composition of the barrier film, textile reinforcement fabric and the interposed adhesive or hardenable resinous material of the flexible encasement composite material, may be varied to meet the design specification for each type of aircraft and its fuselage section.

Individual blankets are overlapped and joined to form a cabin surrounding layer. They are located in the space between the outer surfaces of the cabin compartment panels and the inboard surface of the aluminum skin of the aircraft fuselage shell. They are set off by an air space and mounted away from contact with the inboard surface of the aluminum skin. The blankets are typically attached to the longitudinal aluminum stringers and circumferential structural reinforcements of the fuselage shell.

In flight, pressurization and depressurization of the aircraft fuselage shell causes air exchange within the blanket. This is commonly referred to as breathing of the blanket. Air exchange or pressure equalization occurs through needle holes, other penetrations and designed holes or venting of the blanket casing. Recently, the needle holes and fibrous projections were found to wick water into the blankets. The initial remedy cited in the prior art was the use of adhesive tape to cover stitched seams. However, such taping is heavy, labor intensive to apply, and costly. Heat seal joined seams have recently been preferred. Such sealed seam joining of prior art aircraft insulation blankets is difficult. The uneven mating surfaces are not planar and are comprised of at least three components, each having a different plastic melt range. One component is a hygroscopic textile reinforcement. Moisture retained by such fibrous materials, and resultant steam, interferes with hermetic heat sealing. Accordingly, prior art blanket encasement materials require an added weight of costly thermoplastic adhesive or resinous material to fill the uneven mating surfaces for heat seal joining. Nevertheless, the hydrophilic textile reinforcement yarn cross-section bundles continue to project at the seam edges of prior art blankets and can wick moisture into such blanket by capillary action. Furthermore, such non-stitched blankets are vented to avoid internal pressurization and bursting of the sealed seams upon air expansion and internal pressurization of the blankets in flight. However, such vents also allow moisture vapor laden air to be drawn into the breathing blankets.

Moisture vapor is continuously generated in flight by sources within the fuselage. A large portion is moisture vapor exhaled by the passengers and crew. Such moisture vapor is part of the air and travels with it throughout the aircraft fuselage. The movement of moisture laden air is toward the coldest body, usually the aluminum fuselage skin. Its movement is merely retarded by a tortuous path through cabin wall acoustic panel joints, overlapped insulation blankets and relatively thin barrier films. The aluminum shell and skin of the fuselage can reach subzero temperatures and the dew point and temperature gradient lines frequently intersect within the nearby insulation blanket. Such conditions allow moisture condensate to form on the surfaces of the conventional blanket's encasement material, and even within the insulator core of such blankets. The condensate can freeze within the blanket and later it can thaw and drip. Despite surface tension behavior, capillary action and other contrary phenomenon, moisture was erroneously expected to gravity drain from vented blankets and flow along the aluminum skin and structure to the lowermost fuselage bilge area for expulsion from the aircraft. However, aircraft reportedly do accumulate and frequently fly with more than a ton of moisture vapor condensate within saturated, soggy, matted and collapsed aircraft insulation blankets. The effective insulation design thickness and placement of such glass fiber insulation is lost when blankets are wet. Furthermore, such water logged blankets of the prior art detract from the designed payload capacity and fuel efficiency of the aircraft, and related design dependent calculations are rendered unreliable as a basis for critical pilot decisions.

Another problem relates to the safety of the aircraft occupants. The encasement materials, particularly the textile reinforcement and the hardenable resinous adhesive materials used in prior art aircraft insulation blankets, are inherently flammable materials. They are typically flame retarded by use of substantial quantities of chemical additives. The chemical additives typically include antimony and halogenated materials, such as bromine. When such prior art blankets are heated, for example, in an aircraft fuel oil sustained fire, those chemical additives decompose and are intended to release flame retarding fumes. However, those flame retarding fumes are highly toxic, and if inhaled, they can incapacitate and render occupants unable to evacuate the aircraft.

Various attachments and aircraft insulation arrangements have been disclosed in the prior art. One such arrangement, for example, is disclosed in U.S. Pat. No. 2,819,032 (1958) to A. J. Detrie, et al. Although primarily an acoustic insulator, it does contain thermal insulating cells. However, it is a relatively heavy panel adhered directly to the aircraft fuselage's aluminum skin. Therefore it does not permit easy removal and installation for routine inspection and maintenance of the inboard skin. Furthermore, it does not insulate the aluminum stringers and other structural components which are joined to the aluminum skin. Another arrangement is disclosed in U.S. Pat. Nos. 4,235,398 (1978) and 4,291,851 (1981) to William R. Johnson, assigned to The Boeing Company. This patent involves an aircraft fuselage of molded sandwich panel construction and a molded insulation panel with integral stand-off projections to create an air space between the fuselage and the insulation panels. This relatively inflexible insulation panel is not easily adaptable to the various structural reinforcement configurations and contours of today's conventional semi-monococque, stressed aluminum skinned fuselage structure. My own inventions, U.S. Pat. No. 3,562,043 (1971) and British Patent No. 1,235,919 (1971) and Swiss Patent No. 521,227 (1972) and U.S. Pat. No. 4,003,777 (1977) all relate to flexible, multilayer laminates, including a barrier film layer joined to a textile reinforcement fabric having raised and recessed portions. These are joined with interposed, hardenable resinous adhesive materials; however, these patents teach that such hardenable resinous materials bond to the projecting portions of the fibrous reinforcement fabric without filling its recessed portions and interstices. Accordingly, the multilayer laminate structures and processes of my expired British patent have been examined, considered similar to and part of the prior art, relating to the flexible multilayer laminates of conventional aircraft insulation blankets. The conventional aircraft insulation blankets and my prior inventions commonly have fibrous voids, interstices and recesses, and in common, they have the disadvantage of moisture vapor condensate retention.

All of the conventional aircraft insulation blankets of the prior art have sought, without success, to resolve the long existing moisture ingress, water retention and other functional problems which are summarized herein. These were comprehensively diagrammed, photographed and disclosed in technical papers presented by related industry representatives and the major international aircraft manufacturers at a "Moisture Ingress In Aircraft Insulation" symposium. They appear in the Aug. 5, 1993, papers published by the symposium sponsors, SAE International, Warrendale, Pa. 15096-0001.

Accordingly, all aircraft fuselage insulation blankets heretofore known suffer from a number of disadvantages:

(a) Moisture vapor condensate tends to form on the blanket interior surfaces in flight. Insulation materials become matted down, soggy and lose their loft, thickness and effective insulating properties when wet.

(b) Moisture vapor condensate is retained in the fibrous capillaries and yarn interstices of the conventional blanket's textile reinforcement.

(c) The typical prior art blanket is not durable when subjected to actual flight conditions, including cycles of cold, heat, humidity, pressure, and unpredictable episodes of high altitude cosmic radiation over a period of time. The moisture barrier film and the adhesive or hardenable resinous material, particularly polyester type resinous materials and polyethyleneterepthalate film, can degrade, become brittle and the blankets break open.

(d) Sewn seams and thread bound projecting bundles of fibrous insulation wick moisture into the blanket. The remedial pressure sensitive adhesive tape, used to cover the stitches of sewn blanket seams, is too heavy and costly. Such taping adds weight and decreases the aircraft's payload capacity and fuel efficiency.

(e) The prior art insulation blankets, when not sewn, require encasement materials having an added volume and weight of costly thermoplastic resinous material to improve heat sealability of seams.

(f) The vents of prior art insulating blanket casings allow ingress of moisture laden air.

(g) The prior art aircraft insulation blanket material is inherently flammable and typically uses substantial quantities of flame retarding chemical additives. When heated, for example in an aircraft fuel sustained fire, certain prior art aircraft insulation blankets are intended to decompose to release highly toxic, flame retarding fumes, inhalation of which can incapacitate and render occupants unable to evacuate a burning aircraft.

(h) Such prior art insulation blankets are costly, occupy fuselage space, add weight, reduce payload capacity and, when dry, have a function limited to insulation and passenger comfort. But they do not contribute to enhance passenger safety or to inhibit certain latent explosive conditions in the aircraft.

OBJECTS AND ADVANTAGES

Accordingly, several objects and advantages of my blanket are:

(a) To provide a blanket which will inhibit undesirable formation of moisture vapor condensate within its casing, in flight.

(b) To provide a blanket in which the insulating materials will not become matted down, soggy, soaked, and lose their effective designed thickness and insulating properties.

(c) To provide a blanket which will be durable. A blanket in which the molecular chain structure of the barrier film and resinous materials will be exposed to substantially less degradation by oxidation and hydrolysis, and will not be readily made brittle or cleaved.

(d) To provide a blanket with hermetic sealed seams which will resist wicking of moisture into the blanket.

(e) To provide a blanket having compatible mating surfaces for effective heat sealability and hermetic sealed seam joining without the added cost and weight of relatively higher density hardenable resinous material.

(f) To provide a blanket having vents which resist moisture ingress.

(g) To provide an blanket which will suppress flames without release of substantial quantities of toxic chemical flame retardant fumes, inhalation of which can incapacitate and render occupants unable to evacuate the aircraft.

(h) To provide an insulation blanket which is functional, and is an integral part of a system to suppress flames and to inhibit latent, explosive fuel vapor to air mixtures, otherwise predictably probable, in aircraft fuel tank head space. Accordingly, a blanket which is an integral part of a reliable system to prevent root-cause related ignition and explosion of the aircraft by accident, transient energy, and terrorists.

Therefore, it is an object of the present invention to provide an "Aircraft Passenger Safety Enhanced Fuselage Insulation Blanket". Such improved blanket is cost effective, more durable, lighter weight, easier to produce, does not accumulate water, increases the payload and fuel efficiency of the aircraft, suppresses flames, inhibits explosive fuel vapor to air ratio mixtures in the fuel tanks, and prevents terrorist or accidental ignition of such explosive vapors, to avoid explosion of the aircraft.

Further objects and advantages of my blanket will become apparent from a consideration of the drawings and ensuing description.

DRAWING FIGURES

In the drawings, closely related figures have the same number but different alphabetic suffixes.

| Reference Numerals In Drawings | |
|---|---|
| 10 | cabin compartment |
| 11 | seating |
| 12 | cabin compartment panels |
| 14 | improved flexible aircraft fuselage insulation blanket |
| 15 | prior art basic textile reinforced flexible aircraft insulation blanket |
| 16 | set-off air space |
| 17 | vacant fuselage space |
| 18 | aluminum fuselage skin |
| 19 | liquid fuel |
| 20 | bilge area |
| 21 | fuel tank |
| 22 | aircraft fuselage shell |
| 23 | fuel tank's vapor head space |
| 24 | insulator core |
| 24a | prior art insulator core |
| 26 | vented flexible blanket casing |

-continued

| Reference Numerals In Drawings | |
|---|---|
| 26a | prior art flexible blanket casing |
| 28 | tailored encasement panel |
| 28a | prior art tailored encasement panel |
| 29 | flexible encasement material |
| 29a | prior art flexible encasement material |
| 30 | vented plurality of seam joined tailored panels |
| 30a | prior art vented plurality of seam joined tailored panels |
| 33 | substantially hermetic seals |
| 34 | vent |
| 36 | substantially hermetic joined gas flow adapter |
| 37 | regulated differential pressure and regulated blanket pressure relief valve modular control |
| 38 | gas flow connector |
| 39 | substantially inert gas pressure source |
| 40 | discharge outlet |
| 42 | fuel tank gas connector |
| 44 | regulated fuel tank pressure relief valve and regulated vacuum relief valve modular control |
| 46 | gas discharge and intake opening |
| 50 | hardenable resinous material |
| 50a | prior art hardenable resinous compound material |
| 52 | flexible plastic barrier film |
| 52a | prior art flexible plastic barrier film |
| 54 | textile reinforcement |
| 54a | prior art textile reinforcement |
| 56 | supplementary insulator material |
| 60 | primary web unwind station |
| 61 | optional web unwind station |
| 62 | idler roll |
| 63 | rubber roll |
| 64 | gravure roll |
| 65 | enclosed doctor blade module |
| 66 | coating container |
| 67 | oven |
| 68 | product winder |
| 70 | cooling roll (b) |
| 71 | cooling roll (a) |

Figure 1:
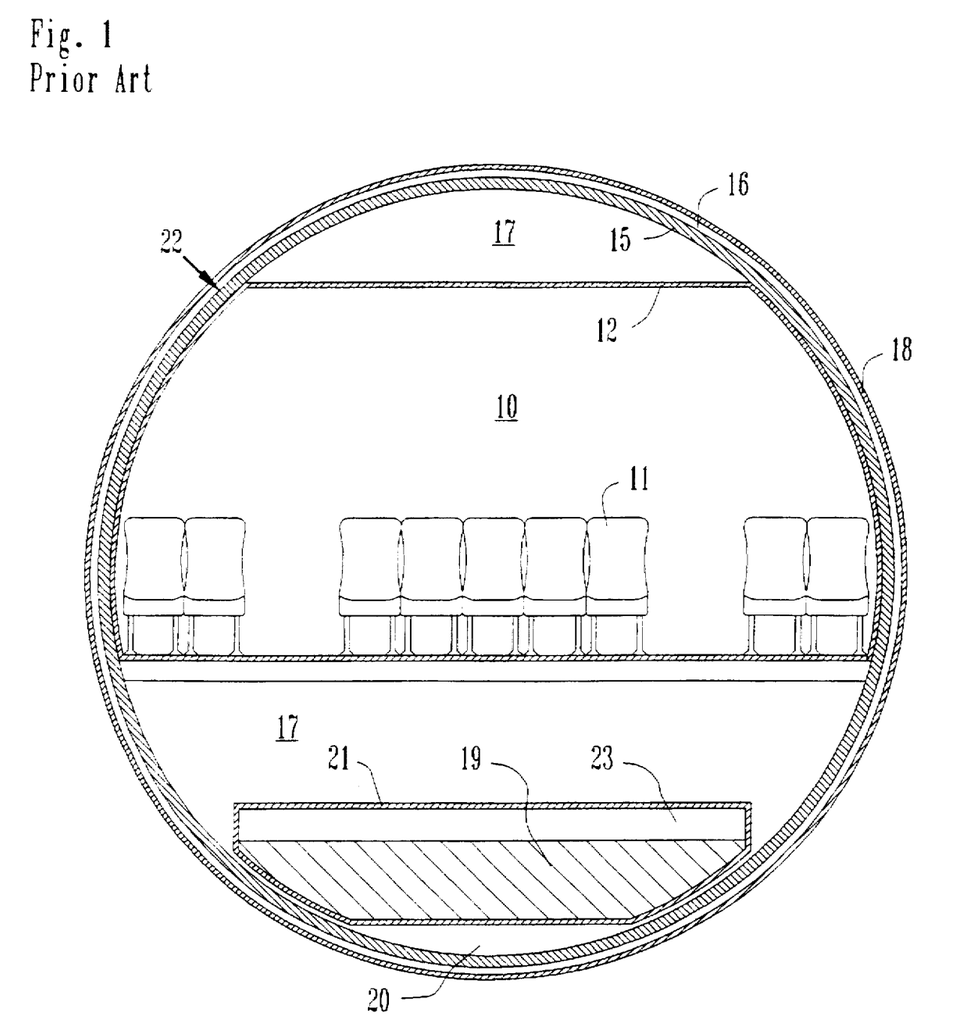
FIG. 1 shows a schematic cross-sectional view of a conventional aircraft fuselage shell.
Figures 1A, 1B:
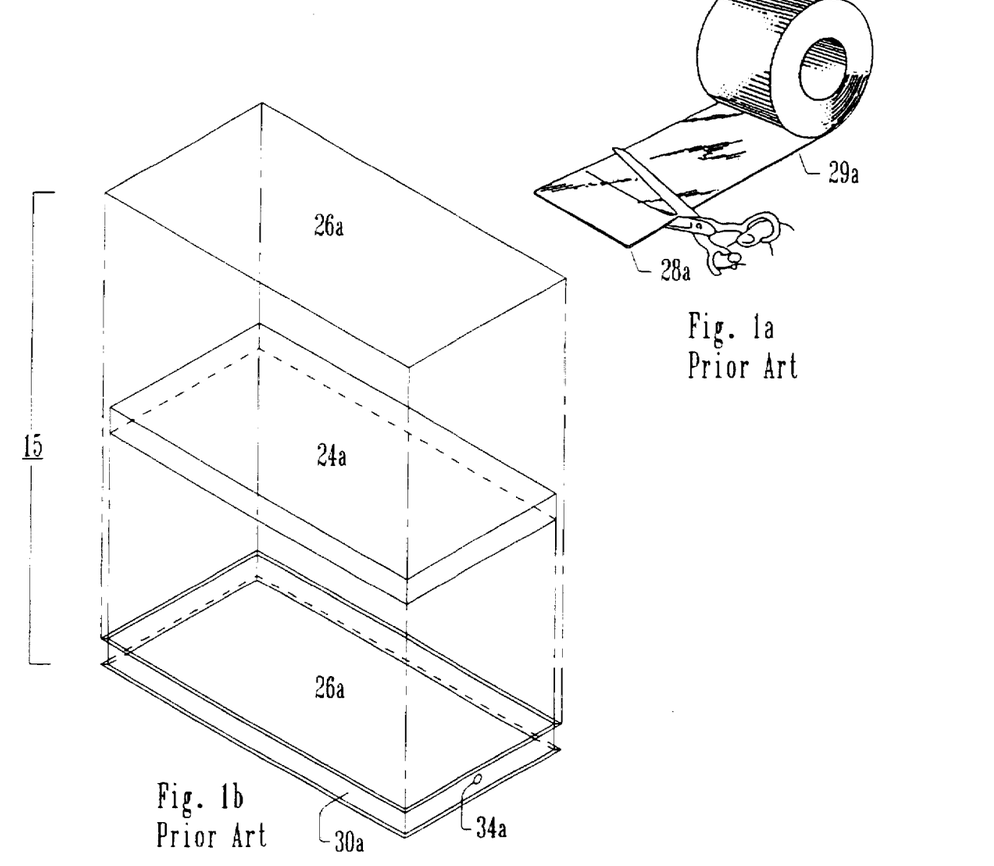
FIG. 1A is a schematic perspective view of the flexible encasement material supply roll for a basic prior art aircraft insulation blanket.
FIG. 1B is a schematic perspective exploded view of a basic prior art flexible aircraft insulation blanket.
Figure 1C:
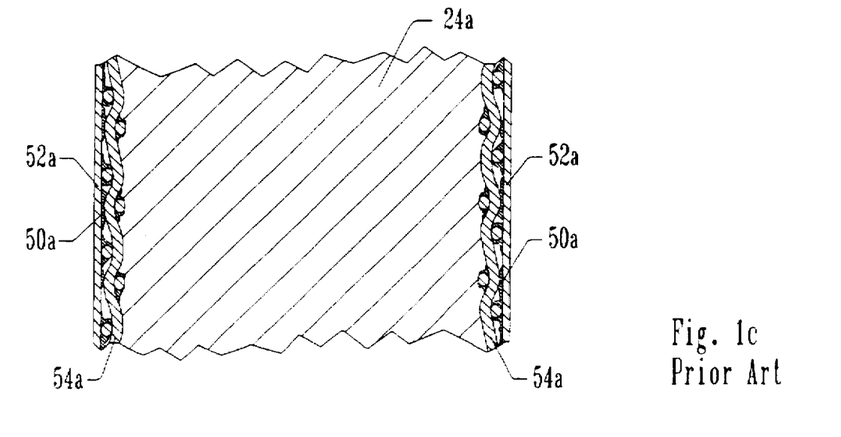
FIG. 1C is an enlarged, fragmentary, planar cross-sectional schematic view of a basic prior art insulation blanket.

DESCRIPTION AND OPERATIONS—FIGS. 1 TO 1C

Background and Prior Art

FIG. 1 illustrates a conventional aircraft having an outermost aluminum fuselage skin 18 and an innermost cabin compartment 10, which includes the seating 11 and inhabited space contained within the cabin compartment panels 12. The inboard face of the relatively thin, stressed aluminum fuselage skin 18 is attached to structural aluminum stringers and circumferential reinforcement members (not shown) which are part of the aircraft fuselage shell 22. Layers of flexible aircraft fuselage insulation blankets of the prior art 15 occupy otherwise vacant fuselage space 17, at least to substantially surround cabin compartment 10. The blankets are interposed between the outer surfaces of the cabin compartment panels 12 and the inboard side of the aluminum fuselage skin 18, attached to the structural reinforcements (not shown) and spaced away from, and separated from contact with aluminum fuselage skin 18 by a layer of set-off air space 16. The lower area of the fuselage space includes at least one fuel tank 21 having fuel vapor head space 23 which is vented (not shown) to the outside atmosphere. Certain areas, including the baggage and flight operational equipment and other functional areas, are not shown in this diagram; however, they are part of the relatively large area depicted as vacant fuselage space 17. Moisture vapor condensate formed in the fuselage shell drains by gravity to the bilge area 20, the lowermost area of the fuselage shell, for discharge to the outside atmosphere.

FIG. 1A depicts a supply roll and an unwound length of a flexible encasement material 29a cut to various template patterns to form a tailored encasement panel 28a.

FIG. 1B is an exploded perspective view of a basic prior art blanket 15, depicting a vented blanket casing 26a including several tailored panels which may have sewn and taped (not shown in detail) or heat seal joined seams, to create a vented assembly which has designed volume determined by the pattern of its tailored panels 28a, and at least one hole or a vent 34a. This assembly is referred to as a vented plurality of seam joined tailored panels 30a. Blanket casing 26a surrounds an insulator core 24a, which may seek to accommodate such predetermined volume. Blanket casing 26a is made from a flexible encasement material, including at least three elements shown in FIG. 1C; a flexible plastic barrier film 52a, a textile reinforcement 54a, an adhesive or a hardenable resinous material 50a. Textile reinforcement 54a and hardenable resinous material 50a are often more flammable than film 52a. At least one of the elements, usually a compounded hardenable resinous material 50a, frequently contains toxic fume emitting chemical flame retardant additives of substantial quantity, sufficient to render itself and the combined elements self-extinguishing.

Figures 2A, 2B, 2C:
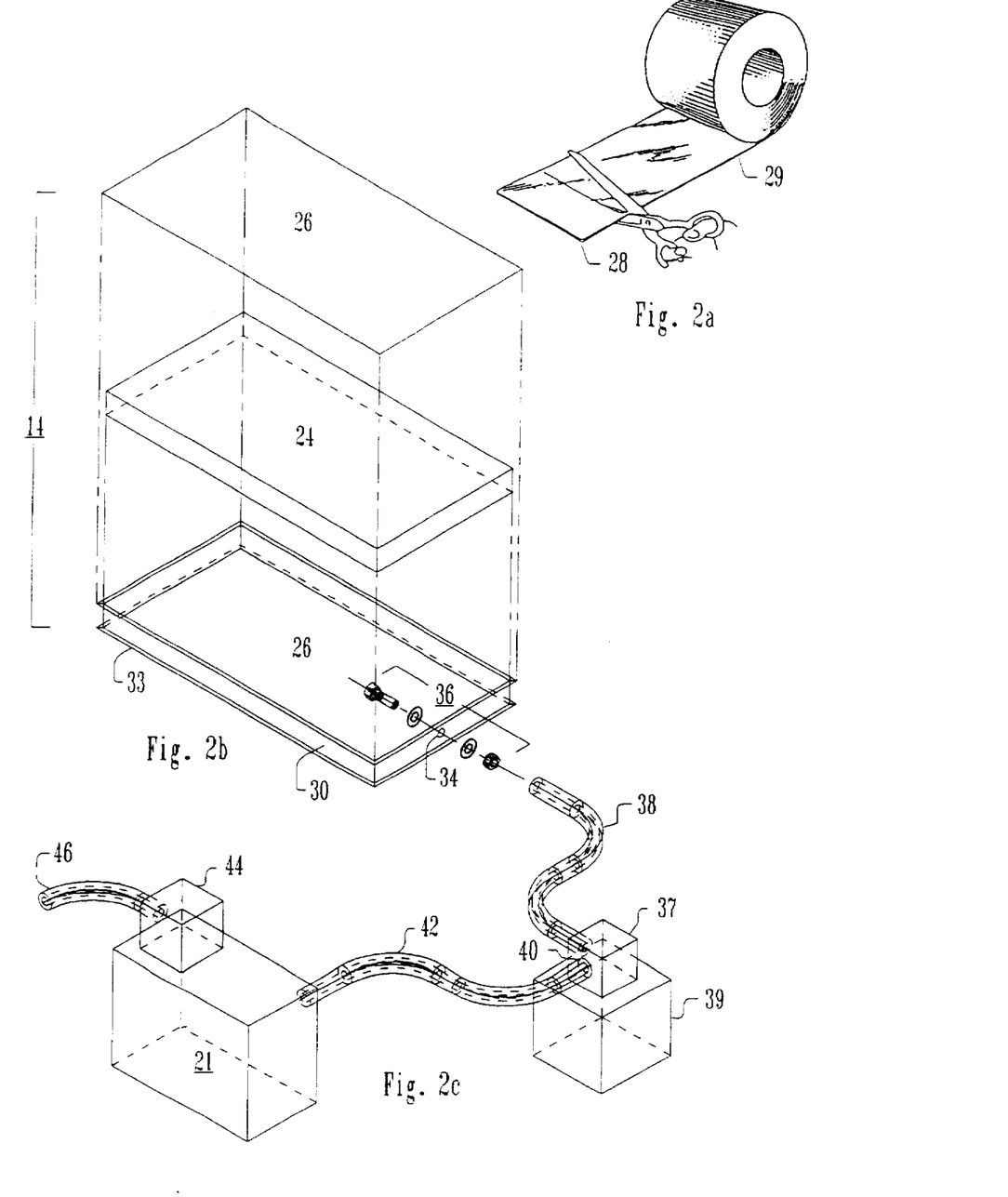
FIG. 2A is a schematic perspective view of the flexible encasement material supply roll for my improved insulation blanket.
FIG. 2B is a schematic perspective exploded view of the main embodiment of my improved blanket.
FIG. 2C is a schematic substantially inert gas flow diagram.
Figure 3A:
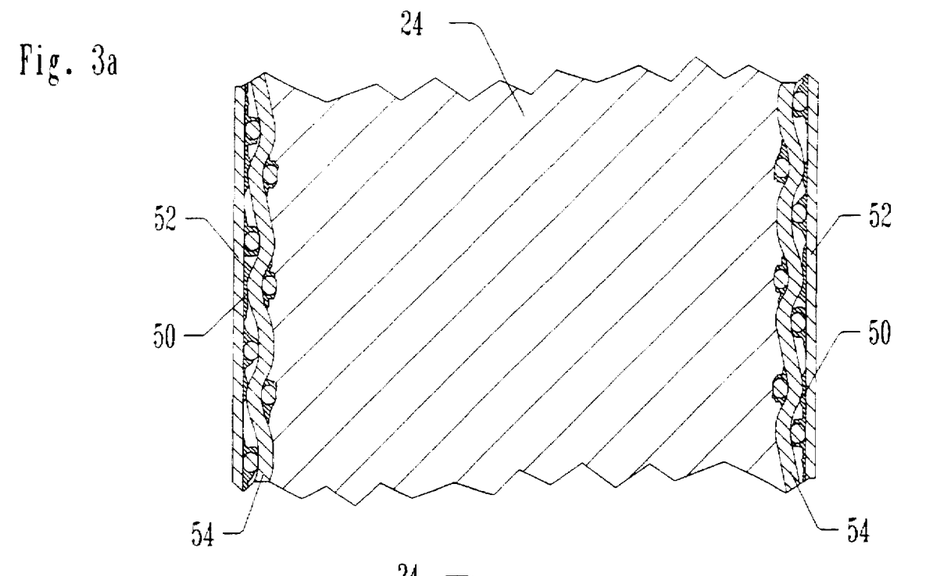
FIG. 3A is an enlarged, fragmentary, planar cross-sectional schematic view of a textile reinforced alternative embodiment of my improved blanket.
Figure 3B:
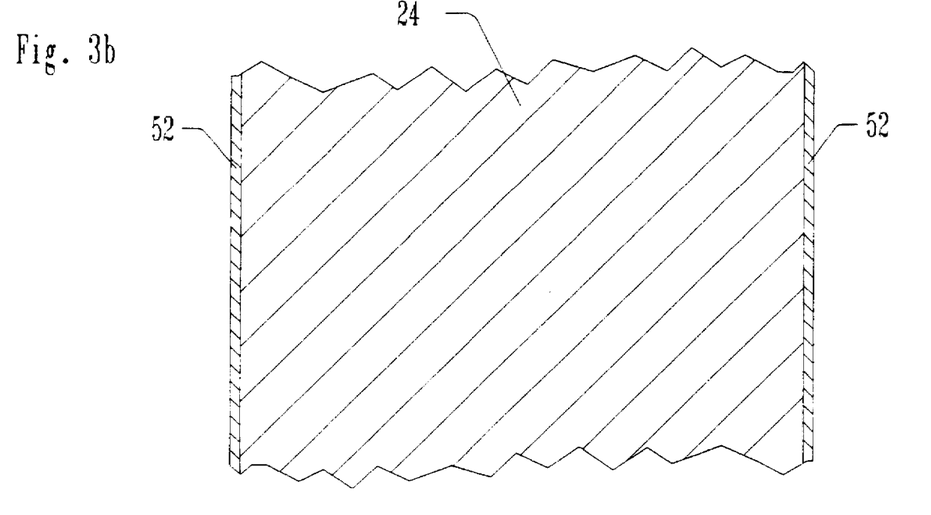
FIG. 3B is an enlarged, fragmentary, planar cross-sectional schematic view of a basic embodiment of my improved aircraft fuselage insulation blanket.
Figure 3C:
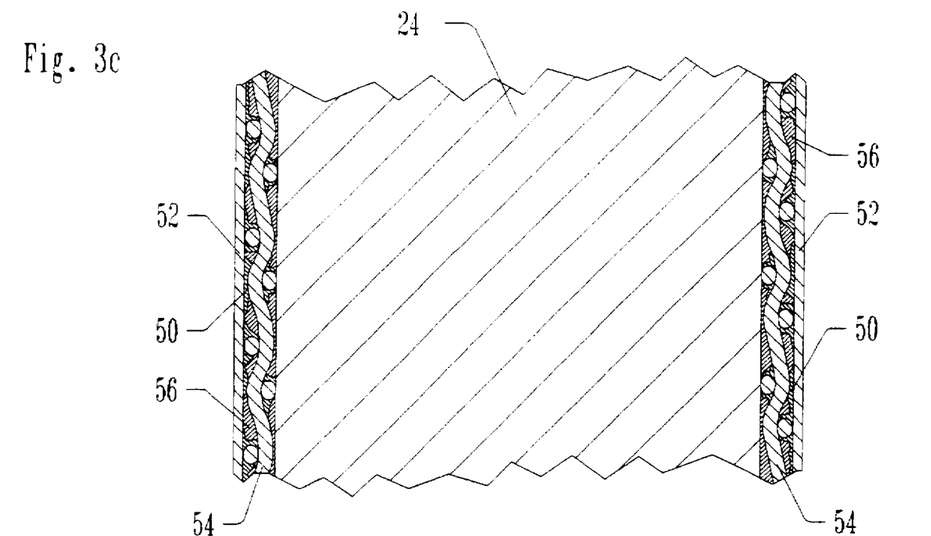
FIG. 3C, and FIG. 3D, and 3E are fragmentary cross-sectional schematic views of additional alternative embodiments of my improved blanket.
Figure 3D:
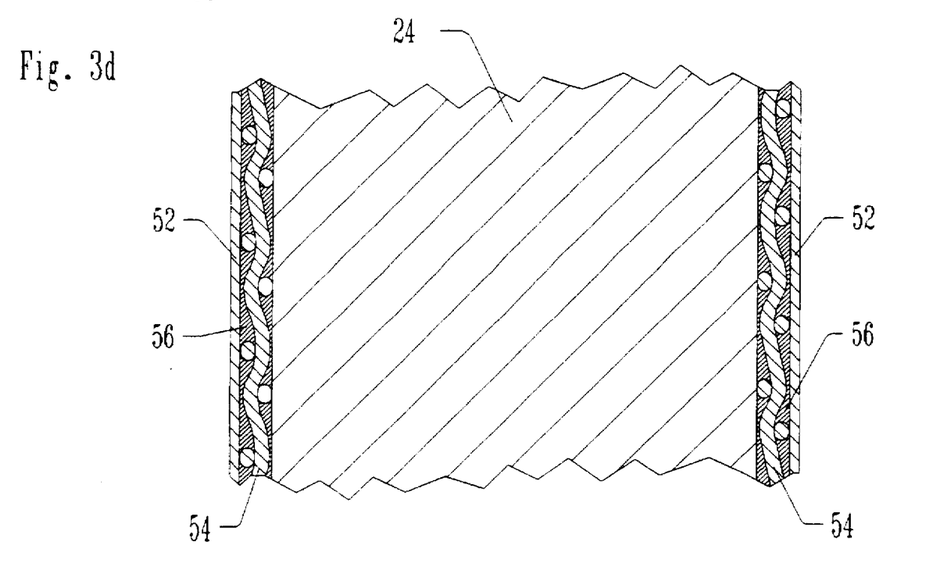
Figure 3E:
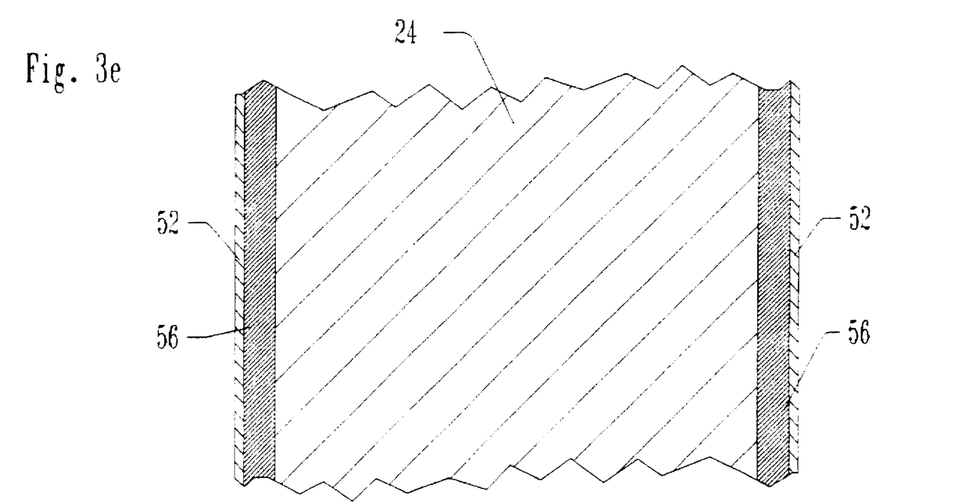
Figure 4:
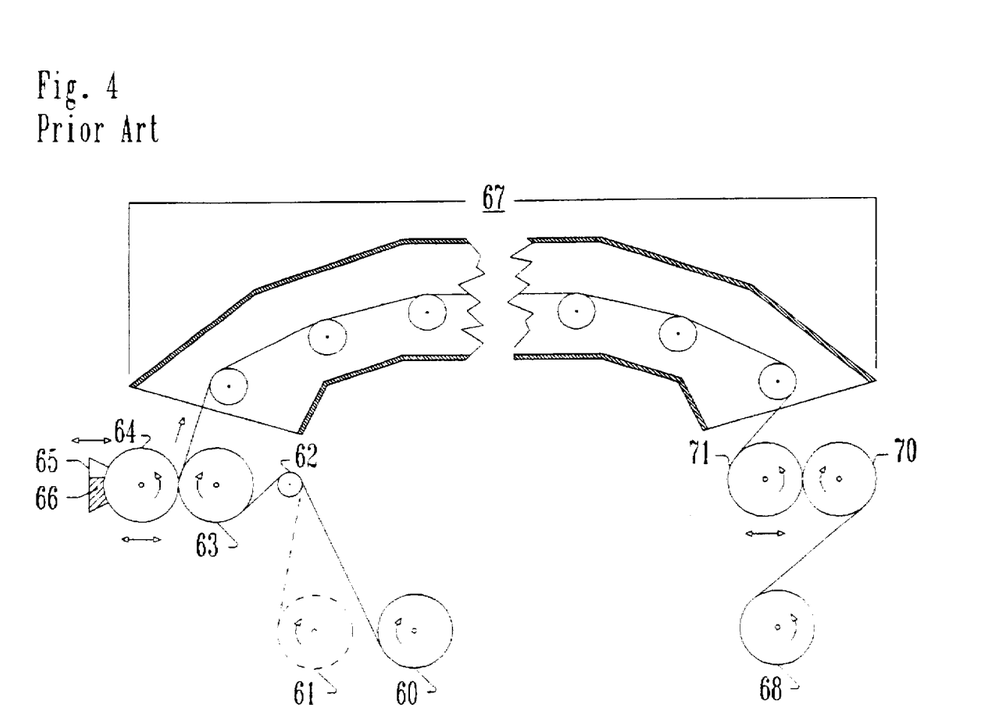
FIG. 4 is a schematic web process diagram.

DESCRIPTION—FIGS. 2 TO 4

FIG. 2A depicts a supply roll and an unwound length of a flexible encasement material 29 cut to various template patterns to form a tailored encasement panel 28.

FIG. 2B illustrates an exploded perspective view of blanket 14 and depicts a vented blanket casing 26, including several tailored panels 28 which are heat seal seam joined and have substantially hermetic seals 33, to create a vented assembly which has a predetermined design volume established by the pattern of its tailored panels 28. This assembly is referred to here as a vented plurality of seam joined tailored panels 30. Blanket casing 26 surrounds an insulator core 24 which accommodates such predetermined volume. At least one hole or a vent 34 in panel 30 is attached, in an airtight way, to adapt to a gas flow connector 38, herein called a hermetically joined gas flow adapter 36 to displace any contained air and to connect vent 34 to a substantially inert gas pressure source 39, to inflate blanket 14 with a substantially inert gas.

Referring to FIG. 2C, gas flow connector 38 is attached to a substantially inert gas pressure source 39 through a regulated differential pressure and regulated blanket pressure relief valve modular control 37. The blanket pressure relief valve control 37 has at least one discharge outlet 40. Such blanket discharged substantially inert gas, and/or substantially inert gas discharged directly from the pressure source 39, flows via fuel tank gas connector 42 to at least one fuel tank 21. Fuel tank 21 includes a regulated fuel tank pressure relief valve and regulated vacuum relief valve modular control 44, having at least one gas intake and discharge opening 46.

FIG. 3B is a fragmented enlarged cross-sectional planar view of the basic embodiment of blanket 14. An insulator core 24 is shown sandwiched between a material comprising only one element. In this basic embodiment of blanket 14, that material comprises a flexible plastic barrier film 52.

FIG. 2A depicts another view of such material being unwound from a supply roll. Such material is referred to here as a flexible encasement material 29. In FIG. 2B, an exploded view, shows the joined assembly comprising material 29 to be surrounding an insulator core 24.

FIG. 3E similarly illustrates another embodiment of blanket 14. In this embodiment, insulator 24 is surrounded by material 29, comprising two elements, plastic barrier film 52 and a supplementary insulator material 56.

FIG. 3A similarly illustrates another embodiment of blanket 14. In this embodiment, insulator 24 is surrounded by material 29 comprising three elements, plastic barrier film 52, textile reinforcement 54, and a hardenable resinous material 50.

FIG. 3D similarly illustrates still another embodiment of blanket 14. In this embodiment, insulator 24 is surrounded by material 29 comprising three elements, plastic barrier film 52, textile reinforcement 54, and supplementary insulator material 56.

FIG. 3C similarly illustrates an additional embodiment of blanket 14. In this embodiment, insulator 24 is surrounded by material 29 comprising four elements, plastic barrier film 52, textile reinforcement 54, hardenable resinous material 50 and supplementary insulator material 56.

FIG. 4 is an optional web process diagram. It is a schematic planar view, to illustrate a typical web laminating and/or coating process, including a primary web unwind station 60 and an additional optional web unwind station 61 connected by separate web paths joining at idler roll 62. A contiguous web path leads from roll 62 to follow a circumferential segment of rubber roll 60 beyond its point of tangential contact with a conventional engraved metering roll or gravure roll 64. A conventional coating container and a doctor blade, or an enclosed doctor blade module 65, encloses a coating container 66 which continuously fills cell matrices of the module 65 enclosed, advancing, circumferential segment of rotating gravure roll 64. The flowable resinous material adhesively transfers from the cell matrices at point of tangential contact to any exposed, compatible substrate surface carried on roll 63. The web path continues from roll 63 to a hardening zone or oven 67, depicted in a fragmented cross-sectional view, to reveal an arched web path supported by idler rolls to the oven exit. The web path leads from the exit of oven 67 to follow a circumferential segment of a cooling roll (a) 71 to a point of tangential contact with and transfer to a circumferential path on a cooling roll (b) 70 to a point of tangency leading to an optional, conventional web festoon accumulator (not shown) or directly to a product winder 68.

OPERATION AND FUNCTION—FIGS. 2A, 2B, 2C, 3B

Main Embodiment

The preferred embodiment of the instant invention will be described in more detail regarding function and operation with further reference to the above drawings.

FIG. 2A depicts another view of flexible encasement material 29 which, according to the enlarged detail of the FIG. 3B, directly includes film 52. FIG. 2A shows film 52 being cut to panels 28 for blanket 14. Such flexible plastic barrier film 52 is preferably preformed, substantially shape-retaining and is thermoplastic. Film 52 can be manufactured by several processes, including but not limited to, for example, blow extrusion, sheet extrusion and cast coating. Such films 52 are preferably drawn and heatset in two or more axes to orient their molecular structure, to increase their modulus and ultimate break strength, and to approximately balance the machine direction and transverse direction benefits of such improved physical properties. Other preferred characteristics of film 52 include, but are not limited to, for example, substantial resistance to corrosive chemicals, relatively low shrinkage at elevated temperatures, relatively low brittleness upon aging, and relatively less flame propagation tendency. Additional preferred characteristics are, substantial retention of physical properties throughout a broad temperature range, and ease of hermetic heat sealabilty. FIG. 2B depicts hermetic seals 33. Applicable conventional heat sealing processes include, but are not limited to, for example, thermal impulse sealers, hot bar sealers, hot roller sealers, dielectric sealers, hot air sealers, and ultrasonic sealers. My most preferred hermetic sealed seam sealing machine transmits ultrasonic mechanical vibratory energy through compatible thermoplastic resinous materials, to continuously generate frictional heat build-up at a mated seam interface. The energy is controllably directed to melt and bond at least a predetermined seam width of continuously advancing, compatible, mated thermoplastic material. Such most preferred, continuous ultrasonic seam sealing machines are conventional and commercially available from several sources, including but not limited to, for example, Branson Ultrasonics Corporation, Danbury Conn. 06813-1961.

Various film combinations can be used to make blanket 14, including but not limited to, for example, synthetic polymers, copolymers, coextruded polymers, and film laminates. Preferred film materials for flexible plastic barrier film 52, include but are not limited to, for example, polyamide, polyvinylidene chloride, polyurethane, polyvinyl fluoride, and more preferred polypropylene, and most preferred polyethyleneterepthalate. Polyethyleneterepthalate is also known as PET or polyester film. Such most preferred flexible plastic barrier film 52 is available from several manufacturers, including but not limited to, for example, E. I. Du Pont de Nemours and Company, Wilmington, Del. 19805, under the registered trademark Mylar polyester film. Although polypropylene is highly preferred for its approximately 30 percent lower specific gravity, polyethyleneterepthalate is the most preferred. It has sufficient flexibility for blanket 14 in the range of 3.5 to 75 micron thickness, and is most preferable at about 35 to 50 micron thickness for the main embodiment of blanket 14, in the following combination and approximate range of values:

| Thickness, range, microns: | 3.5–75 |
| Tensile Strength, MD, kg per mm sq. | 18–20 |
| Elongation, MD, %: | 115–144 |
| Shrinkage, 150 deg. C, 30', MD/TD, %: | 2.1/1.1 to 1.6/1.1 |
| UL94 Flame Class: | - "Slow to self-extinguishing"- 94VTM-2 |

Polyester film is a relatively better gas barrier for nitrogen and a relatively worse barrier for oxygen and moisture vapor. Actually, polyester film is about a six times better barrier for nitrogen than it is for oxygen. The nitrogen permeability of a 25 micron thick polyester film at room temperature is about 1 cubic centimeter per 645 square centimeters per day. The reader will appreciate the appropriateness of these inherent selective gas permeability properties for the main embodiment of blanket 14. In my most preferred embodiment, blanket 14 is inflated with a substantially dry substantially inert gas, substantially nitrogen, at a positive differential blanket pressure relative to the cabin atmosphere's pressure. While I believe that the direction of diffusion is away from the blanket interior, and that selective displacement of accumulated moisture vapor and oxygen away from the blanket has a profoundly positive effect on the durability, safety, non-flammability, insulator properties and reduced weight of blanket 14, I don't wish to be bound by this theory. The prior art, on the contrary, has relied on moisture vapor barrier properties of films and coatings, as a passive way to resist moisture vapor entry into blanket 15, but then neglected to address the problem of moisture vapor freely entering blanket 15 through vent 34a, especially during pressure equalization or breathing of blanket 15. The instant invention, on the contrary, teaches use of an active force to occlude moisture vapor from entry into blanket 14, an opposing differential, substantially inert gas pressure, a substantially nitrogen pressure.

Continuing with reference to FIG. 3B, the second depicted element is an insulator core 24. As the reader will recall by referring to FIG. 1A, in the prior art, the typical insulator material was a flame resistant glass fiber batting. The relatively high fiber bending modulus and compressional resilience of dry glass fiber batting has, in the prior art, been relied upon to support the blanket casing and to maintain the insulation design thickness of blanket 15. My blanket 14, however, accommodates substantially inert gas pressure to inflate the blanket casing to its insulation design thickness, without reliance on glass fiber batting to achieve or maintain design thickness. Blanket 14 encloses substantially dry, substantially inert gas. Preferred gases include, but are not limited to, for example, argon, nitrogen, xenon, halocarbon, and helium. Substantially nitrogen is my most preferred substantially inert gas for blanket 14. Nitrogen is plentiful and relatively inexpensive. It is a major component of air, and is an excellent thermal insulator and flame suppressant. Conventional glass fiber aircraft insulation batting is, typically, about 6.4 to 24 kilograms per cubic meter. By contrast, blanket 14 having enclosed nitrogen at 1.0 atmosphere and 23 degrees centigrade has a specific volume of about 1.16 kilograms per cubic meter or about 13.8 cubic feet per pound. In my most preferred insulator core 24, the major proportion of the core volume is nitrogen. The type of additional or other preferred insulation materials, if any, can include both flammable and non-flammable materials. The additional preferred insulator core 24 materials include, but are not limited to, for example, conventional glass fiber batting, synthetic fiber batting, polystyrene foam, polyethylene foam, microspheric hollow cells having thermoplastic cell walls, and other insulator materials. Synthetic fiber batting includes, but is not limited to, for example, randomized air laid or carded and cross-laid, resin spray bonded and cured synthetic fiber batting, of about 4 kilogram per cubic meter comprising hollow core polyester fiber. Polystyrene foam insulation includes, but is not limited to, for example, conventional expanded polystyrene foam granular or sheet form packaging materials of about 4 kilograms per cubic meter. Polyethylene foam includes, but is not limited to, for example, conventional expanded packaging sheets of various thickness at about 80 kilograms per cubic meter density. Hollow, gas filled, microspheric polyvinylidene chloride walled, closed cells dispersed in a viscoelastic synthetic resinous binder include, but are not limited to, for example, a spray dispersed and bonded layer about 250 microns thick and about 50 kilograms per cubic meter density. Various combinations for insulator core 24 can include a proportion of such other insulation materials, but most preferably include a substantially greater volume proportion of nitrogen and a substantially lesser volume proportion, if any, of such other insulation materials. It is most preferred that my blanket's insulator core 24 has a combined total blanket core volume density of substantially less than about 6.4 kilograms per cubic meter. Currently, the Government and industry specifications which must be met by such new and more preferred insulator core 24 include, for example, ASTM C-800, BMS 8-48, DMS 2151, DMS 1967, STM 26-701, LAC C26-1277, C-26-1184, ATS 1000.001, FAR 25.853 and 25.855, OSU 65/65. Those specifications were written for prior art insulation blankets which typically comprise glass fiber insulation batting. Qualification of my most preferred materials to meet these current Government and external specifications could delay soonest possible commercial adoption of the main embodiment of blanket 14. There is a need to provide the soonest opportunity for enhanced aircraft passenger safety. Accordingly, solely for expedient qualification under the foregoing specifications, at this time, my most preferred insulator core 24 material for the main embodiment of blanket 14 is nitrogen, the major volume component, in combination with a minor volume proportion of conventional glass fiber insulation. For example, a conventional glass fiber aircraft insulation product qualified to meet current government specifications is sold under the registered trademark, Microlite AA, and is commercially available from Schuller International, Inc., Denver, Colo. 80217-5108. Such glass fiber batting materials can have density in the approximate range of about 6.4 kilograms per cubic meter to about 24 kilograms per cubic meter. Therefore my preferred minor volume component for insulator core 24 material, if any, has a density of about 6.4 kilograms per cubic meter. My most preferred insulator core 24, substantially nitrogen, has a designed volume density of about 1.16 kilograms per cubic meter. However, the total volume proportion of the heavier glass fiber material can be reduced, if not totally eliminated, depending upon an updating of the foregoing Government and industry specifications.

FIG. 2B illustrates at least one vent 34, attached in an airtight way to a substantially hermetic joined gas flow adapter 36, to substantially displace air from blanket 14 and also to connect vent 34 to a substantially inert gas pressure source 39 to substantially inflate blanket 14. There are many other preferred ways for adapting and connecting, including but not limited to, for example, my more preferred adapter, a tailored adapter made from a length of flexible tailored encasement material 29, fabricated with ultrasonic heat sealed seams, to form a tube with flanges that can be hermetic heat sealed seam attached (not illustrated) to the margins of vent 34. However, for simplicity of illustration, my most preferred adapter is a conventional bulkhead adapter with gaskets, airtight fittings, hose clamps, and hose. Such adapter assemblies are commercially available from several sources, including but not limited to, for example, Catalog 15-315-1, Fisher Scientific Company, Springfield, N.J. 07081. It is within the scope of my blanket to have more than one connected vent 34, and to connect several blankets in parallel or in series to pressure source 39. Although not shown in FIG. 2B, it is most preferable to pressure leak test and then to evacuate air from the blanket by vacuum pump, prior to connecting blanket 14 to substantially inert gas pressure source 39. However, in a series connection of blankets having more than one connected vent, air is directly displaced by, for example, substantially nitrogen pressure upon connection of the first blanket of such series to substantially inert pressure source 39.

FIG. 2C illustrates a gas connector 38 attached to substantially inert gas pressure source 39. Such substantially inert gas pressure sources include, but are not limited to, for example, refillable bladders, refillable pressurized cylinders or onboard gas generators. The gas is a substantially inert gas, including but not limited to, for example, argon, halocarbon, helium and nitrogen. On the basis of safety, ecology, and cost, my most preferred substantially inert gas for blanket 14 is substantially nitrogen. My most preferred substantially inert gas pressure source is a commercial membrane separation technology based nitrogen gas generator source. Although not shown, such preferred nitrogen generator has no moving parts and simply requires a compressed air pressure input to generate relatively lower pressure nitrogen, and a by-product side stream of oxygen. Such relatively light weight, inexpensive nitrogen generators are commercially available from several sources, including but not limited to, for example, Permea Div., Air Products and Chemicals, Inc., Allentown, Pa. 18195-9979.

Referring to FIG. 2C, substantially inert gas pressure source 39 includes a differential pressure regulator and a blanket pressure relief valve modular control 37, comprising a relief valve outlet port or a discharge outlet 40. Blanket pressure relief discharge outlet 40 has a gas connector or fuel tank connector 42. Such connector 42 hermetically connects substantially inert gas flow from discharge 40 to the fuel tank head space 23 of at least one, or to a plurality of, fuselage and wing fuel tanks 21, connected in series (not shown) or parallel. FIG. 1 shows the aircraft's liquid fuel 19 and the fuel tank's vapor head space 23. Reverting to FIG. 2C, the fuel tank's pressure relief valve and vacuum breaker or vacuum relief valve are referred to here as, a regulated fuel tank pressure relief valve and regulated vacuum relief modular control 44. Modular control 44 responds to various on-board and outside conditions, including but not limited to, for example, pressure, temperature, fuel volume, and head space oxygen content, in a programmed intelligent way. Modular control 44 responds in a programmed cooperative way with modular control 37, to jointly anticipate and maintain fuel vapor-to-air-to-inert gas ratio, in the head space 23, at a safe margin, below the contained fuel vapor mixture's lower explosive limit. Such valves and transmitters are commercially available from several sources, including but not limited to, for example, Fisher Controls, Clayton, Mo. 63105 and Rosemont Transmitters Div., Parsippany, N.J. 07450.

FIG. 2B, FIG. 2C and FIG. 1 illustrate operation of the substantially inert gas pressure system and use of blanket 14 as a substantially inert gas reservoir supply source, to displace air from head space 23 of fuel tanks 21 with nitrogen. Fuel tank head space volume increases in proportion to the engines consumption of liquid jet fuel 19. To avoid the possibility of unprecedented, accidental or terrorist initiated ignition of the explosive jet fuel vapor concentrations in the head space 23, it is essential to supply substantially inert gas at a rate sufficient to displace enough air to maintain the, otherwise, explosive jet fuel vapor to air ratio below its lower explosive limits, at any given flight or on-ground temperature, typically encountered anywhere on planet earth.

Various mechanical, electromagnetic and radiation sources of transient energy, such as, for example, unpredictable events of high-altitude galactic cosmic radiation, can ignite an explosive fuel vapor mixture. An aircraft insulation blanket intended to shield against the unpredictable events of high altitude galactic cosmic radiation had been previously considered. While I don't wish to be held to this, I do feel that shielding or dissipation of unpredictable transient energy is unreliable, does not get to the root-cause, and would, in this case, be an inadequate and unacceptable response to a highly probable and latently deadly situation. Elimination of the explosive fuel vapor condition with a blanket of nitrogen is a simpler, more direct and a more certain preventive measure for such potential aircraft explosions.

In the event that substantially inert gas pressure source 39 is located off-board and the fuel tank's head space and the blanket system are filled with substantially inert gas before take-off of the aircraft, alternative substantially inert gas volume and pressure can be supplied to fuel tank 21 from blankets 14, in flight. This can be accomplished by increasing the relative cabin pressure to blanket pressure differential, by intelligent regulation of modular control 37. In an alternative way, substantially inert gas can be supplied by intelligent regulation of fuel tank vacuum relief modular control valve 44, to draw substantially inert gas from blanket 14, to relieve the negative pressure created in fuel tanks 21 by the engine's consumption of liquid fuel 19. As previously discussed, use of an on-board, membrane separation technology based nitrogen generator for substantially inert gas pressure supply source 39 is my most preferred source. An on-board nitrogen generator of sufficient capacity allows blankets 14 to be maintained at designed volume for optimum insulation, unless unusual circumstances, such as an impending explosive fuel vapor mixture in a fuel tank head space, requires a portion of the blanket's reservoir of nitrogen to be transferred to fuel tanks 21.

OPERATION AND FUNCTION—FIGS. 3–4

Additional Embodiments

Additional embodiments of the instant invention will now be described in more detail regarding function and operation, with reference to the fragmented cross-sectional planar views of FIG. 3E, FIG. 3A, FIG. 3C, FIG. 3D, and schematic web process diagram FIG. 4.

FIG. 3E illustrates an additional embodiment of the instant invention. When compared to the main embodiment depicted in FIG. 3B, FIG. 3E shows one further included element, a supplementary insulator material 56. The most preferred insulator core 24 of this alternate embodiment is substantially nitrogen. In this alternate embodiment, material 56 occupies a relatively smaller portion of the greater volume otherwise filled by substantially nitrogen. The volume occupied by material 56 is preferably less than about 30 percent of the volume otherwise occupied by core material 24 and most preferably about 5 to 20 percent of the volume otherwise occupied by core material 24. The function of material 56 is to provide both thermal and acoustic insulation. Material 56 is positioned to join the free surface area of flexible encasement material 29, which in enlarged view, FIG. 3E is depicted to include film 52. Supplementary insulator material 56 is coated on the side of encasement material 29 nearest to insulator core 24.

Material 56 includes a plurality of microballoons or substantially microspheric, closed, gas filled, hollow cells dispersed in a viscoelastic binder comprising a hardenable resinous material 50 in flowable form. The flowable form includes, but is not limited to, for example, a solvent solution, a waterborne dispersion, an airborne dispersion or spray, a reactive prepolymer, and a reactive hot molten prepolymer of hardenable resinous material 50. These hollow cells have cell wall material, including but not limited to, for example, glass and ceramic and resinous and thermoplastic resinous. Hollow ceramic microspheres are preferred in a diameter range of 10 microns to 150 microns in a density of about 0.70 grams per cubic centimeter. Hollow ceramic microspheres are available from several sources, including but not limited to, for example, Zeelan Industries, Inc., St. Paul, Minn. 55144-100 under the trademark Z-Lite Spheres ceramic microspheres. Hollow glass microspheres are preferred in a diameter range of 15 microns to 125 microns, in a density range of approximately 0.125 grams per cubic centimeter to 0.320 grams per cubic centimeter and preferably at the lowest commercially available density. Hollow glass microspheres are available from several sources, including but not limited to, for example, 3M Company, St. Paul, Minn. 55144-100, under the trademark Scotchlite glass bubbles. Hollow glass microspheres are more preferred than hollow ceramic microspheres based on their relative lower cost and lower weight per unit volume. The most preferred cell wall material for the hollow microspheres comprising material 56 is substantially thermoplastic and the thermoplastic polymer is substantially polyvinylidene chloride copolymer. The preferred microspheres have an unexpanded particle size range of approximately 3 microns to 70 microns. The most preferred diameter range is approximately 9 to 20 microns. Such most preferred microspheres are thermally expandable and have an expanded minimum density ranging from less than about 17 kilograms per cubic meter to less than about 30 kilograms per cubic meter, preferably less than about 17 kilograms per cubic meter. The minimum thermal expansion starting temperature is in the range of about 75 to 135 degrees centigrade and the maximum expansion temperature range is about 115 to 195 degrees centigrade. Such most preferred microspheres are available from several sources in pre-expanded form or in expandable form, including but not limited to, for example, from Expancel Inc., Duluth, Ga. 30136, under the registered trademark Expancel microspheres.

The preferred resinous material of the binder of supplementary insulator material 56 is hardenable resinous material 50 and that includes, but is not limited to, for example, acrylic, polyvinylidene chloride, polyester, and polyester type polyurethane. The most preferred hardenable resinous material 50 is a polyester type polyurethane. The microspheres in pre-expanded form or expandable form are preferably dispersed at less than about 90 percent in a binder of hardenable resinous material 50 while the resin is in flowable form. The flowable form of hardenable resinous material 50 includes, but is not limited to, for example, a solvent solution, latex dispersion, molten and hot reactive prepolymer. In all of the examples, the spherical, closed, gas filled, hollow cells are simply stirred into the flowable mass, or may be dispersed with air turbulence in a multi-stream spray which includes resinous material 50, microspheres, and optionally, even chopped filamentous textile reinforcement. Such equipment is available commercially from several sources, including but not limited to, for example, Electrostatic Components, Danbury, Conn. 0610, under the registered trademark Extender dry spray system. The various described combinations of the foregoing resinous materials, their methods of application and their flowable forms, are useful for both hardenable resinous material 50 directly, in the subsequently described embodiments of FIG. 3A and FIG. 3C, and also for the binder of supplementary insulator 56 in all embodiments, including this described embodiment, according to FIG. 3E.

I now discuss more detailed examples of flowable forms of the preferred hardenable resinous material 50, including but not limited to, for example, a polyurethane adhesive comprising 100 parts by weight polyester polyol having an average molecular weight of about 3200 when made from hexanediol, butanediol and adipic acid, and about 12 to 18 parts by weight polymethylene polyphenylisocyanate, and about 4 to 6 parts by weight oxazoladine, reacted to a prepolymer percent hydroxyl content of 1.6 to 3.2. The foregoing is flowable when molten or when dissolved, as less than about 30 percent solids in a solution of methyl ethyl ketone. All such raw materials are well known and commercially available. The oxazoladine is available from several sources, including but not limited to, for example, Angus Chemical Company, Buffalo Grove, Ill. 60089, sold under the registered trademark Zoldine. Another flowable example includes less than about 20 parts by weight of substantially reacted, thermoplastic, linear polyester-type elastomeric polyurethane, based on 4,4'-diphenyl diisocyanate for solvent solution in methyl ethyl ketone or tetrahydrofuran, by stirring. The characteristics of this preferred hardenable resinous material 50 include heat sealability above 52 degrees centigrade, high rate of crystallization, good green strength, good cold crack resistance, excellent bond performance at elevated temperatures. Such hardenable resinous material 50 is available in solvent soluble pellet form from several sources, including but not limited to, for example, The B. F. Goodrich Company, Cleveland, Ohio 44131, under the registered trademark Estane thermoplastic polyurethane, or Bayer Corporation, Akron, Ohio 44313-4270, as product E-297, under the registered trademark Desmocol. Another flowable example is most preferred for hardenable resinous material 50, for reason of allowing most ecologically compliant discharge of volatile fumes during hardening. This is an aqueous polyurethane dispersion of a linear aliphatic polyester urethane, based on hexamethylene diisocyanate and isophorone diisocyanate. Such waterborne dispersions of polyester-type polyurethane are available from several sources, including but not limited to, for example, The B.F. Goodrich Company, Cleveland, Ohio 44131, under the registered trademark Sancure waterborne polyurethane polymer, or from Bayer Corporation, Akron, Ohio 44313-4270 under the registered trademark Dispercoll aqueous polyurethane dispersion.

The most preferred process sequence is coating application followed by product hardening. The coating process can be discontinuous or continuous and the substrate can be a continuous roll of film 52, tailored panels 28 or fabricated blanket casing 26. The coated and hardened product may be accumulated in a festoon, wound in a roll or used directly in blanket 14. The preferred commercially available coating application method includes, but is not limited to, for example, spray, brush, screen print, knife coat, transfer coat, and roller coat. I will now describe my most preferred method of coating application and hardening. Referring to FIG. 4, film 52 is unwound from its supply roll located at position 60 and while transported on rubber roll 63, it is coated with a premetered volume of supplementary insulator material 56 in flowable form. A container for material 56 is depicted as coating container 66 of enclosed doctor blade module 65, which meters a predetermine volume of flowable material 56 into the engraved cell matrices of gravure roll 64. Material 56 joins and transfers to film 52 at the nip between roll 64 and roll 63. It is hardened while passing through oven 67 and, upon exit from oven 67, it is cooled by contact with cooling roll (a) 71, and cooling roll (b) 70, and is thereafter optionally accumulated by conventional festoon (not shown) or directly wound by product winder 68. Such process machinery is available commercially from several sources, including but not limited to, for example, Nuovo Isotex S.p.A., 36066 Sandrigo (Vicenza), Italy.

FIG. 3A illustrates an additional embodiment of the instant invention. The main embodiment elements referred to in FIG. 3B, when viewed in contrast to alternative embodiment FIG. 3A, depicts two further included elements, a textile reinforcement 54 and hardenable resinous material 50. The objective of textile reinforcement 54 in this additional embodiment of blanket 14 is improved tear resistance for film 52. Such textile reinforced type of structure, when used in the prior art blanket 15, had the disadvantage of need for chemical flame retardant additives. However, the additional weight and need for such flame retardant additives is substantially overcome by the flame suppressing properties of the substantially inert gas contained by blanket 14. Furthermore, hardenable resinous material 50 has improved thermoplastic properties and forms substantially stronger heat seal bonds when used without the compounded addition of substantial quantities of such flame retardant materials. The reader will recall that the function, detail and composition of the most preferred hardenable resinous material 50 has already been reviewed at length in prior paragraphs.

The next discussed element is textile reinforcement 54. The most preferred textile reinforcement is selected on basis of several parameters, including but not limited to, for example, cost, linear high polymer type, degree of orientation, yarn denier or weight per unit length, tenacity or strength as a function of fiber density, number of filaments per yarn bundle, denier per filament, type and twist of yarn. Also considered are the mechanical and chemical properties of the reinforcement yarns, including but not limited to, for example, viscoelastic stress-strain behavior, and compatibility in a complex, cyclically stressed composite, including intimate chemical and physical interaction with film 52, resinous material 50, and supplementary insulator material 56.

The most preferred textile reinforcement 54 is selected from the textile reinforcement group consisting of an interlaced yarn structure comprising a continuous multifilament yarn woven scrim fabric and a non interlaced yarn reinforced insitu structure, comprising substantially right angle cross-laid continuous multifilament yarns, and non-wovens. In the prior art, textile reinforced flexible encasement materials of the type based on such interlaced yarn structure are commercially available from several manufacturers, including but not limited to, for example, Lamart Corporation, Clifton, N.J. 07015. Additionally, in the prior art, textile reinforced flexible encasement material of the type based on such non-woven, non interlaced, yarn reinforced insitu structure is available from several manufacturers, including but not limited to, for example, Orcon Corporation, Union City, Calif. 94587, under the registered trademark Orcofilm. The substantially right angle, cross-laid continuous multifilament, non-interlaced yarn reinforced insitu structure is my preferred textile reinforcement 54, for reason of its lower raw material cost; however, the yarn cross-lay process machinery is complex, costly and is not commercially available to the same extent and, in the same number as, for example, looms, skilled weavers and conventional textile weaving mills.

The preferred linear high polymer type for continuous multifilament reinforcement yarn include, but are not limited to, for example, polyester, carbon, nylon, olefin, and aramid. As previously discussed, blanket 14 is intended for use in many aircraft types and locations within each aircraft model. The size, shape, weight, thicknesses, strength, tear resistance and other physical properties of blankets 14 are broadly varied to suit these needs. My most preferred textile reinforcement 54 is a high tenacity continuous multifilament nylon yarn in the range of about 40 to 250 denier. The most preferred size is about 40 denier in the warp and about 70 denier in the filling. Such yarn is commercially available from several suppliers, including but not limited to, for example, E. I. Du Pont de Nemours and Company, Wilmington, Del. 19805.

My most preferred textile reinforcement 54 is an interlaced or woven scrim structure, having a conventional two-end leno weave design with two dupe yarns of about one half the denier in the warp direction for each larger yarn interlaced in the filling direction. Such scrim fabric is preferably woven at about 10 to 26 ends per 25 centimeters in the warp direction and about 5 to 15 filling yarns per 25 centimeters in the filling direction. Each of the two intersecting yarn systems have about 3 to 5 turns of "Z" twist per 25 centimeters. The most preferred reinforcement 54 has about 10 warp ends and about 5 filling yarns per 25 centimeters. Woven textile scrim reinforcement fabrics are commercially available from several sources, including but not limited to, for example, J. P. Stevens & Co., Inc., Greenville, S.C. 29602.

FIG. 3A depicts a textile reinforced alternative to the main embodiment of blanket 14. The elements shown in FIG. 3A including insulator material 24, film material 52, hardenable resinous material 50, and textile reinforcement 54, have all been previously described.

Referring to FIG. 4, FIG. 2A and FIG. 2B, I now describe a process for making the first textile reinforced alternative to the main embodiment of blanket 14. As illustrated in FIG. 4, film 52 is unwound from its supply roll located at primary web unwind station 60, and textile reinforcement 54 is simultaneously unwound at a substantially synchronous linear rate from its supply roll located at optional unwind station 61. The two materials join at idler roll 62 and traveling together are transported on rubber roll 63. A reservoir of material 50, in flowable form, is depicted in coating container 66, and is metered by enclosed doctor blade module 65 in volume sufficient to fill the engraved cell matrices of gravure roll 64. Resinous material 50 joins and transfers simultaneously and jointly to both film 52 and reinforcement 54, at a substantially elongated zone of deformed tangential contact in the nip between gravure roll 64 and rubber roll 63. Material 50 is substantially hardened while it is passing through oven 67. Upon exit from oven 67, flexible encasement material 29 is initially cooled by cooling roll (a) 71 and cooling roll (b) 70. Thereafter, material 29 is optionally accumulated by conventional festoon (not shown) or wound directly by product winder 68. The wound product may be used directly, to cut tailored panels 28, to be heat sealed seam joined by substantially hermetic seals 33, to enclose insulator core 24 in flexible blanket casing 26, for hermetic joined gas flow adapter 36, to be attached to vent 34, to allow evacuation of air from and to connect blanket 14 to substantially inert gas pressure source 39, to inflate blanket 14. Optionally, if a single pass is insufficient, a precursor roll of material 29 from product winder 68 is returned to unwind position 60, to pass through the process sequence repeatedly to receive additional dosage of material 50, until there is a sufficient weight and volume of material 50 deposited and hardened. This allows assembly of blanket 14 by heat sealed seams having substantially hermetic seals 33.

FIG. 3C illustrates a fragmented cross-sectional view of another textile reinforced alternative to the main embodiment of blanket 14. All of the numbered elements depicted in FIG. 3C have previously been described above. In the last sentence of the preceding paragraph, I describe a precursor roll of material 29 having textile reinforcement 54 bonded to film 52, but having insufficient weight and volume of resinous material 50, to form substantially hermetic sealed seams. That roll of precursor material, and the preceding description of an example of a process by which it can be made, will be the starting point for my following description.

I will now describe an example of the continued process. Referring to FIG. 4, the forgoing roll of material is moved from product winder 68 to a new position, primary unwind station 60. Referring to FIG. 4, FIG. 2A and FIG. 2B, I now describe the continued process for making the second textile reinforced alternative to the main embodiment of blanket 14. As illustrated in FIG. 4, the previously described precursor roll of material is unwound from its supply roll located at primary web unwind station 60. The materials passes around a segment of idler roll 62 and then travels on rubber roll 63. A reservoir of material 56, in flowable form, is depicted in coating container 66 and is metered by enclosed doctor blade module 65 in volume sufficient to fill the engraved cell matrices of gravure roll 64. Resinous material 56 joins and transfers to the exposed free face of the precursor at a substantially elongated zone of deformed tangential contact in the nip between gravure roll 64 and rubber roll 63. Material 56 is substantially hardened while it is passing through oven 67. Upon exit from oven 67, flexible encasement material 29 is initially cooled by cooling roll (a) 71 and cooling roll (b) 70. Thereafter, material 29 is optionally accumulated by conventional festoon (not shown) or wound directly by product winder 68. The wound product may be used directly to cut tailored panels 28, to be heat sealed seamed joined with substantially hermetic seals 33, to enclose insulator core 24 in flexible blanket casing 26, for hermetic joined gas flow adapter 36 to be attached to vent 34, to allow evacuation of air from and to connect blanket 14 to substantially inert gas pressure source 39, to inflate blanket 14.

The object of the FIG. 3C illustrated alternative embodiment of blanket 14 is the use of an additional volume of relatively lower density supplementary insulator material 56 to impart several improved functions. The first function is to substantially embed the textile reinforcement 54, and thereby minimize wicking of moisture into blanket 14, by filling the capillary interstices of fibrous yarn filaments exposed at seam edges. The second function is to substantially fill textile reinforcement 54, to minimize the void volume of recessed portions between yarns and to provide a relatively smoother, more compatible mating surface for hermetic heat seal joining. The third function is to provide an additional layer of relatively lower density material to improved the acoustic and thermal insulating properties of blanket 14. The fourth function is to provide a surface morphology which resists blocking at the interface of superimposed layers, for example, when material 29 is wound upon itself in a roll. The fifth function is to improve heat sealability and the formation of hermetic sealed seams. The sixth function is to reduce the density of material 29.

I don't wish to be held to this theory, however, I do believe that the plurality of relatively hard microspheric cell walls comprising supplementary insulator material 56, and their relatively large surface area, interface synergistically with the relatively softer, viscoelastic, thermoplastic, resinous material 50. A tuned combination imparts an improved propensity for the efficient conversion of mechanical energy to heat. Vibratory mechanical energy is efficiently converted to heat, for example, when such materials are heat sealed by ultrasonic seaming machines. The efficient conversion of such energy to heat appears to be related to the difference between the stiffness represented by the slope of the stress-strain curve of the cell wall material, or the microspheric resonance transmitter, relative to the capacity for work, represented by the area under the stress-strain curve of softer, viscoelastic resinous material 50, the resonance receptor and dampener. In an aircraft acoustic insulation application, for example, a relatively thin layer of supplementary insulator material 56 can contain a great number of efficient resonator and dampener interfaces for acoustic energy to heat transformation. A relatively thin coated layer of supplementary insulator material 56 interposed between a sound source and an aircraft passenger can contain, for example, 1000 acoustic energy absorbing transitions. By comparison, the number of resonating glass fibers and their bonded fibrous intersections, which form their dampening receptors, would be far fewer in a like thickness of a layer of conventional glass fiber aircraft insulation material.

FIG. 3D depicts a third textile reinforced alternative to the main embodiment of blanket 14. The elements shown in FIG. 3D including insulator material 24, film material 52, supplementary insulator material 56, and textile reinforcement 54 have all been previously described.

Referring to FIG. 4, FIG. 2A and FIG. 2B, I now describe a process for making the third textile reinforced alternative to the main embodiment of blanket 14. As illustrated in FIG. 4, film 52 is unwound from its supply roll located at primary web unwind station 60 and textile reinforcement 54 is simultaneously unwound, at a substantially synchronous linear rate, from its supply roll located at optional unwind station 61. The two materials join at idler roll 62 and, traveling together, are transported on rubber roll 63. A reservoir of material 56, in flowable form, is depicted in coating container 66 and, is metered by enclosed doctor blade module 65 in volume sufficient to fill the engraved cell matrices of gravure roll 64. Material 56 joins and transfers simultaneously and jointly to both film 52 and reinforcement 54 at a substantially elongated zone of deformed tangential contact in the nip between gravure roll 64 and rubber roll 63. Material 56 is substantially hardened while it is passing through oven 67. Upon exit from oven 67, flexible encasement material 29 is initially cooled by cooling roll (a) 71 and cooling roll (b) 70. Thereafter, material 29 is optionally accumulated by conventional festoon (not shown) or wound directly by product winder 68. The wound product may be used directly to cut tailored panels 28 to be substantially hermetic heat sealed seam joined with substantially hermetic seals 33, to enclose insulator core 24 in flexible blanket casing 26 for hermetic joined gas flow adapter 36, to be attached to vent 34, to allow evacuation of air from, and to connect blanket 14 to, substantially inert gas pressure source 39 to inflate blanket 14. Optionally, if a single pass is insufficient, a precursor roll of material 29 from product winder 68 is returned to unwind position 60, to pass through the process sequence repeatedly to receive additional dosage of material 56, until there is a sufficient weight and volume of material 56 deposited and hardened to allow assembly of blanket 14 by a heat sealing method to create substantially hermetic seals 33.

The object of the FIG. 3D alternative embodiment of blanket 14 is the use of an additional volume of relatively lower density supplementary insulator material 56, to impart several improved functions and properties. The first function is to substantially embed the textile reinforcement 54 and thereby minimize wicking of moisture into blanket 14, by filling the capillary interstices of fibrous yarn filaments exposed at seam edges. The second function is to substantially fill textile reinforcement 54 to minimize the void volume of recessed portions between yarns to provide a relatively smoother, more compatible mating surface for hermetic heat seal joining. The third function is to provide an additional layer of relatively lower density material to improve the acoustic and thermal insulating properties of blanket 14. The fourth function is to provide a surface morphology which resists blocking at the interface of superimposed layers, for example, when material 29 is wound upon itself in a roll. The fifth function is to improve heat sealability and the formation of hermetic sealed seams. The sixth function is to reduce the density of material 29.

Conclusion, Ramification, and Scope of Invention

Thus, the reader will see that the blanket of the invention provides a lower cost, more durable, lighter weight aircraft insulation blanket. The blanket suppresses flames and will also enhance the opportunity for safe evacuation of passengers in the event of a fire. Additionally, the blanket inhibits explosive fuel vapor to air ratio mixtures in the fuel tanks, and prevents accidental, transient energy, or terrorist ignition of such, otherwise likely, explosive vapors, to avoid explosion of the aircraft. Furthermore, the invention resolves the long-existing problem of aircraft which carry as much as a ton of water in soaked, ineffective insulation blankets. The blanket of the invention does not accumulate water, and it therefore, increases the payload and fuel efficiency of the aircraft.

While my above description contains many specificities, these should not be construed as limitations on the scope of the invention, but as merely providing illustrations of some of the presently preferred embodiments of this invention. Many other variations are possible. For example, the barrier film could be thicker, thinner, comprised of other polymers or blends and have additional layers of coatings on either or both film faces, even patterned and discontinuous coatings. The shape, form, size, color and texture of the blanket could be varied and the blanket could even be comprised of sub-compartments, baffles and dividers. The blankets could occupy additional volume or be in other locations within the aircraft. The function of the insulation blankets could be construed as being different, including but not limited to, for example, a reservoir for substantially inert gas. The method of forming seams could be varied from heat seal to adhesive seal or other ways of forming closures. The blankets could be extruded, vacuum formed or rotationally molded, rather than assembled from panels. The textile reinforcement, if any, could be positioned between film layers or on opposite sides of the film. The insulating materials could be other materials or blends and variations of those described. The parallel or series connection of blankets to the substantially inert gas source could be otherwise arranged, grouped or connected. The control valves, regulators and transmitters for the substantially inert gas pressure and transfer could be different. Many of the objects and advantages of the invention, including but not limited to, for example, displacement and occlusion of moisture from the blanket, could be accomplished with a blend of substantially dry air and substantially inert gas, or even dry air. Still other objects and advantages of the invention could even be obtained without adapting the blanket vent to connect to a gas pressure source.

Accordingly, the scope of the invention should be determined not by the embodiments illustrated, but rather by the appended claims and their legal equivalents.

I claim:

1. An aircraft flame suppression and fuel ignition inhibiting system comprising:

a substantially flexible aircraft fuselage insulation blanket disposed to accommodate a substantially predetermined volume comprising:

a vented flexible blanket casing including at least a vented seam joined tailored panel, said panel including at least a flexible plastic barrier film;

an insulator core substantially surrounded within said blanket casing;

said barrier film being comprised of substantially parallel first and second opposed substantially planar faces, said first face being disposed nearest to said insulator core;

sealing means for seam joining said vented seam joined tailored panel;

wherein the improvement comprises:

said sealing means including substantially hermetic seals; and, said vented blanket casing including at least one vent, said vent comprising a substantially hermetic joined gas flow adapter;

a source of substantially pressurized substantially inert gas;

a gas flow connector;

means for connecting said gas flow connector to said source of substantially pressurized substantially inert gas and to said gas flow adapter;

whereby, substantially inert gas discharged from said source inflates said insulator core to substantially displace and occlude air therefrom, such that said blanket forms a substantially inert gas reservoir for suppressing flames and inhibiting fuel ignition, enhancing the opportunity for safe evacuation of aircraft occupants.

2. The system of claim 1 wherein said blanket casing comprises a vented plurality of seam joined tailored panels.

3. The system of claim 1 wherein said insulator core is selected from the group consisting of glass fiber and synthetic polymeric fiber and synthetic polymeric foam and said substantially inert gas.

4. The system of claim 3 wherein said insulator core includes in combination: fibrous batting and substantially shape retaining substantially non-elastomeric polymeric foam sheet and substantially nitrogen gas.

5. The system of claim 1 further including:

a textile reinforcement bonded to at least one face of said flexible plastic barrier film.

6. The system of claim 1 further comprising:

at least a supplementary insulator layer disposed between said flexible plastic barrier film and said insulator core.

7. The system of claim 6 wherein said supplementary insulator layer includes a dispersed plurality of substantially harder hollow microspheres within a substantially softer viscoelastic thermoplastic resinous material matrix comprising:

transition means including an alternated plurality of the substantially harder microspheres and the substantially softer viscoelastic matrix forming interface transitions to substantially intercept and transform sonic and ultrasonic energy transmission to heat;

whereby, the acoustic insulating property of said blanket is substantially enhanced; and; ultrasonic heat seal bondability of said seam joined panel is substantially improved.

8. The system of claim 7 further comprising:

a textile reinforcement sandwiched between and bonded to said flexible plastic barrier film and said supplementary insulator layer.

9. The system of claim 1 further including:

said substantially displaced and occluded air comprising substantial moisture vapor, such that moisture vapor condensate accumulation within said blanket is substantially inhibited; and, hydrolytic and oxidative degradation of said blanket casing is substantially inhibited.

10. The system of claim 1 further including:

a fuel tank vapor headspace interconnected to said substantially inert gas reservoir and to said substantially pressurized substantially inert gas source and at least one gas intake and discharge opening comprises;

interconnecting means, including an intelligently controlled regulated apportionment of the substantially pressurized substantially inert gas flow, containment, and discharge, to interconnect said source, said reservoir, said fuel tank vapor head space, and the at least one gas intake and discharge opening;

whereby, said substantially pressurized substantially inert gas urges substantial air occlusion, displacement, and discharge from said fuel tank vapor headspace, such that the substantially limited air proportion retained therein inhibits fuel vapor ignition and aircraft fuel tank explosion.

11. The system of claim 1 wherein said plastic barrier film is selected from the group consisting of polypropylene and polyaramid and polyvinidene chloride and polyvinyl flouride and polyurethane and polyester.

12. The blanket of claim 11 comprising said plastic film including:

selective membrane permeability filter means to substantially pass substantially smaller oxygen and moisture vapor components of said discharged and occluded air while substantially blocking passage of substantially larger nitrogen component of said air;

whereby said substantially pressurized substantially inert gas inflating said insulator core urges substantially accelerated passage of the substantially smaller moisture vapor and oxygen components of said air from said insulator core to the exterior atmosphere while substantially retaining therein the substantially larger nitrogen component thereof.

* * * * *

UNITED STATES PATENT AND TRADEMARK OFFICE
CERTIFICATE OF CORRECTION

PATENT NO. : 5,788,184

DATED : 8/4/98

INVENTOR(S) : Eddy

It is certified that error appears in the above-identified patent and that said Letters Patent is hereby corrected as shown below:

Column 22, line 40, "blanket" should read --system--.

Signed and Sealed this

Twenty-third Day of February, 1999

Attest:

Q. TODD DICKINSON

*Attesting Officer*    *Acting Commissioner of Patents and Trademarks*